United States Patent
Sylvain

(10) Patent No.: US 9,049,637 B2
(45) Date of Patent: Jun. 2, 2015

(54) AUTOMATIC TRANSFER OF MOBILE CALLS BETWEEN VOICE OVER INTERNET PROTOCOL (VOIP) AND GUARANTEED SERVICE (GS) NETWORKS BASED ON QUALITY OF SERVICE (QOS) MEASUREMENTS

(75) Inventor: Dany Sylvain, Gatineau (CA)

(73) Assignee: GENBAND US LLC, Frisco, TX (US)

( * ) Notice: Subject to any disclaimer, the term of this patent is extended or adjusted under 35 U.S.C. 154(b) by 320 days.

(21) Appl. No.: 13/228,749

(22) Filed: Sep. 9, 2011

(65) Prior Publication Data

US 2013/0064106 A1    Mar. 14, 2013

(51) Int. Cl.
*H04L 12/26* (2006.01)
*H04W 36/26* (2009.01)
*H04W 36/14* (2009.01)

(52) U.S. Cl.
CPC .............. *H04W 36/26* (2013.01); *H04W 36/14* (2013.01)

(58) Field of Classification Search
None
See application file for complete search history.

(56) References Cited

U.S. PATENT DOCUMENTS

2009/0092093 A1* 4/2009 Wu et al. ................ 370/331
2009/0305709 A1* 12/2009 Panico et al. ............ 455/446
2010/0182921 A1* 7/2010 Basart et al. ........... 370/252

* cited by examiner

Primary Examiner — Minh-Trang Nguyen
(74) Attorney, Agent, or Firm — Fogarty, L.L.C.

(57) ABSTRACT

Methods, systems, and computer readable media for the automatic transfer of mobile calls between wireless packet switched (PS) and guaranteed service (GS) networks based on quality of service (QoS) measurements are disclosed. One method includes establishing a call over the PS or GS network. The method may further include monitoring a quality of service (QoS) parameter associated with the PS network, and comparing the QoS parameter to a minimum quality threshold. The method may further include receiving instructions to initiate a call transfer based upon the comparison of the QoS parameter to the minimum quality threshold.

26 Claims, 12 Drawing Sheets

US 9,049,637 B2

AUTOMATIC TRANSFER OF MOBILE CALLS BETWEEN VOICE OVER INTERNET PROTOCOL (VOIP) AND GUARANTEED SERVICE (GS) NETWORKS BASED ON QUALITY OF SERVICE (QOS) MEASUREMENTS

TECHNICAL FIELD

The subject matter described herein relates to the automatic transfer of mobile calls in a communications network. More specifically, the subject matter disclosed herein relates to the automatic transfer of mobile calls between voice over Internet protocol (VoIP) and guaranteed service (GS) networks based on quality of service (QoS) measurements of the packet switched (PS) network.

BACKGROUND

Mobile phone users typically select mobile telephone and data plans offered by a wireless service provider (WSP) based on service, price, and number of minutes offered during a given time period, for example monthly minutes. WSPs may provide wireless guaranteed service (GS) for carrying voice traffic and packet switched (PS) networks for carrying other types of traffic. Alternatively voice sessions may also be established by over the top (OTT) service providers utilizing wireless PS networks, for example, internet service providers (e.g., Google®), that may no business relationship with the WSP. Quality of service (QoS) is the ability to provide different priority to different applications, users, or data flows to guarantee a certain level of performance within a network. In GS networks, bandwidth is dedicated or reserved, thereby ensuring adequate QoS for given voice calls. This is different from mobile PS networks, in which all different kinds of media traffic may be mixed together in a store-and-forward, best effort manner. In GS networks, some level of QoS control is available to the WSP providing the wireless service; however an OTT service provider typically does not have access to the QoS mechanism and therefore must deal with the "best effort" quality available with the mobile PS network. Thus, mobile PS environments may not be able to assure and/or sustain desired levels of QoS during voice or other media sessions. Service for mobile PS networks may be spotty or vary over time, and QoS may also depend on the location/ movement of the user of the mobile device. Carrying voice over mobile PS networks (i.e., voice over IP or VoIP) can, however, result in reduced cost compared to GS networks. Complementing the public mobile PS network provided by WSP, Wi-Fi access connected to broadband access can also be leveraged to provide a fixed PS network. Being able to shift some calls to a fixed PS network can help reduce calling cost for a user as well as providing better coverage in some areas and better QoS given the higher bandwidth generally available with Wi-Fi access.

For various reasons, a user who is engaged in a call using a mobile device may benefit from being able to easily transfer the delivery mode of the call during the call from a GS to a PS network, or vice versa. Such benefits may include cost savings and a reduction in minutes deducted from their voice plan when the call is transferred between GS and PS networks. WSPs may also benefit from users automatically switching between GS and fixed PS networks, as they can allocate more resources to handle call or data volume when traffic flow becomes diverted away from overly congested public networks. Conversely, it may benefit a user to switch from a PS network to a GS network when QoS is spotty or degrading on the PS network.

Currently, smartphones may be able to install various applications for sending and/or receiving calls over a wireless, PS network, however, such applications are not reliable. For example, a call may not be received or the call may be lost because of poor QoS, lost connection, etc.

Accordingly, in light of these difficulties, a need exists for improved methods, systems, and computer readable media for facilitating the automatic transfer of mobile calls between wireless PS and GS networks based on QoS measurements.

SUMMARY

Methods, systems, and computer readable media for the automatic transfer of mobile calls between wireless packet switched (PS) and guaranteed service (GS) networks based on quality of service (QoS) measurements are disclosed. One method includes establishing a call over the PS or GS network. The method may further include monitoring a quality of service (QoS) parameter associated with the PS network, and comparing the QoS parameter to a minimum quality threshold. The method may further include receiving instructions to initiate a call transfer from PS to GS or vice versa based upon the comparison of the QoS parameter to the minimum quality threshold.

The subject matter described herein may be implemented in software in combination with hardware and/or firmware. As such, the terms "node" "function" or "module" as used herein refer to software in combination with hardware and/or firmware, such as software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for the automatic transfer of mobile calls between wireless packet switched (PS) and guaranteed service (GS) networks based on quality of service (QoS) monitoring and measurements. PS networks may advantageously facilitate less costly voice over Internet protocol (VoIP) sessions which may also reduce the number of minutes deducted from a user's voice plan, however, service may not be as reliably sustained as in GS networks. GS networks may advantageously allocate and maintain an adequate level of QoS required by the voice or media session. The methods, systems, and computer readable media described herein may take advantage of desirable aspects for both PS and GS networks by automatically switching calls therebetween based on QoS measurements of the PS network.

Figure 1:
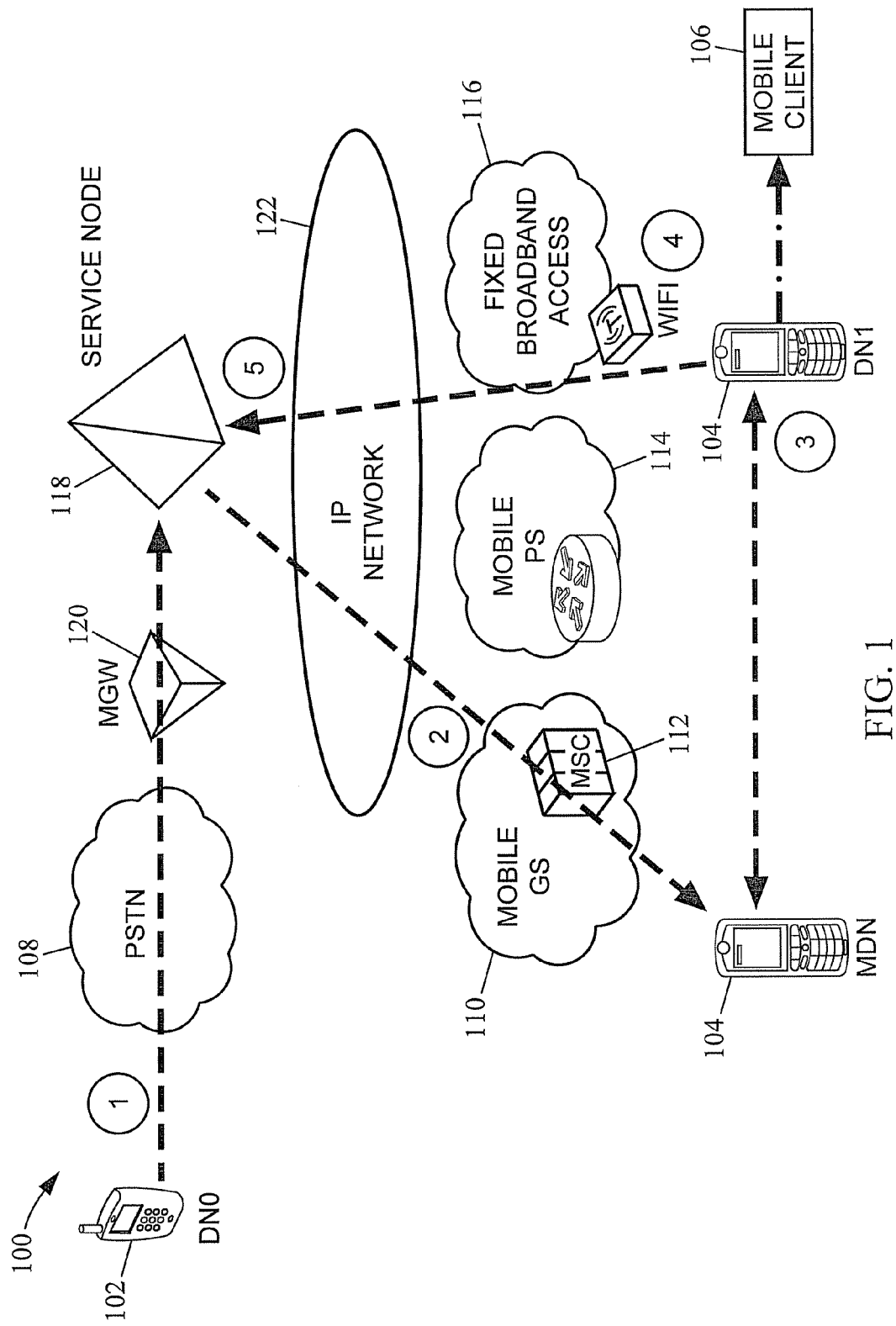
FIG. 1 is a network diagram illustrating an exemplary communication environment according to an embodiment of the present subject matter described herein.

FIG. 1 is a network diagram illustrating an exemplary communication environment or network, generally designated 100, including a service node (FIG. 10) for facilitating the automatic transfer of mobile calls between PS and GS networks according to an embodiment of the subject matter described herein. Referring to FIG. 1, network 100 includes a telephony device, in this case a first mobile device 102 from which a first user may originate a voice or media call session directed towards a second user associated with mobile device 104 served by service node 118 operated by an over the top (OTT) service provider. The second user is associated with a directory number DN1 which is hosted on service node 118 which provides communication services for that second user. The second user receives his primary voice services from the service node 118. Mobile device 104 can also have a directory number MDN hosted by a wireless service provider, typically via one or more mobile switching centers 112. The service node 118 may direct incoming calls toward MDN and MSC 112 which will reach the mobile device 104. Alternatively, service node 118 can route incoming calls via the mobile PS 114 or via a fixed broadband network coupled to WiFi access points, hereafter referred as fixed PS networks 116, to a VoIP or mobile client 106 on same mobile device 104, with the mobile client being associated with the directory number DN1.

Mobile application or client 106 residing on mobile device 104 may become activated and/or otherwise triggered in parallel with the answering an incoming call placed over the GS network 110 to the mobile device 104. Prior to and/or during a call between mobile devices 102 and 104, mobile client 106 may wirelessly access available PS network(s) to continuously monitor and/or analyze the QoS associated with the PS connection by monitoring a parameter or measurement associated with QoS. The QoS parameter may include an individual value or several values associated with the QoS of the available PS network. If the QoS parameter is favorable, that is, meets or exceeds a given minimum quality threshold, mobile client 106 may then initiate a call transfer to automatically transfer the mobile call to the PS network from the GS network based upon the comparison of the QoS parameter to the minimum threshold. Or, where the call was originated in the PS network, the call may remain there as long as the QoS parameter meets or exceeds the threshold. Similarly, where the QoS parameter fails to meet a minimum quality threshold, the mobile call may be transferred and/or remain in the GS network. The minimum quality threshold may include any predetermined value that may be set and maintained by the user or OTT service provider.

The quality threshold may include an individual parameter value, such as one of bit rate, latency, or bit error rate or it may be a combination of several of these values or measurements. QoS may be assessed by measuring round-trip packet information in the PS network including, for example, analyzing the bit rate, latency, and/or bit error rate associated with packet transport. Where one or more measurements of QoS for the PS network (fixed or mobile PS) meet the specified minimum quality threshold, for example, where bit rate is above 20 kilobits per second (kbit/s), latency is less than or equal to 60 milliseconds (msec), and bit error rate is less than a specified percentage, then the call may remain in PS network and/or become transferred from the GS network to a PS network; the call may remain in PS network as long as the QoS of the PS network is maintained above the minimum criteria. Where the QoS of the PS network falls below the minimum criteria, the call may remain and/or become transferred back to the GS network where it has an allocated bandwidth and can provide better service than that measured in the PS network. In one embodiment, mobile client 106 includes a voice over Internet protocol (VoIP) client which runs on mobile device 104 in the background when not in a call.

Referring to FIG. 1, the first uniform dashed arrow shows an incoming call from first mobile device 102, that may transit the public switched telephone network (PSTN), to second mobile device 104, hosted by service node 118. A media gateway 120 may be used to convert from circuit switch connection to VoIP if the connection via the PSTN is not already in a VoIP format. Service node 118 handles the incoming call and decides to deliver the call to mobile device 104 using any one of a mobile PS network 114, a wireless GS network 110, or a fixed PS network 116. In one embodiment, as indicated by the second uniform dashed arrow, the incoming call from device 102 may be delivered via a standard wireless, mobile GS network 110 including a mobile switching center 112 (MSC) to mobile device 104. GS network 110 may be provided by the user's wireless service provide (WSP) or associated wireless networks where the user is roaming. While the GS network 110 is used, the bandwidth has been pre-allocated for the call by the wireless carriers. In one embodiment, GS network 110 includes a wireless GS network which can be implemented using circuit switched technology (also referred to as TDM) where each voice call can be carried in dedicated time slots on circuits. Alternatively, GS network 110 includes a wireless GS network that may be implemented using packet-based VoIP services where bandwidth for each call is reserved on a call by call basis by the equipment operated by the wireless carrier, allowing QoS to be provided. This would be the case for example with LTE (3GPP Long Term Evolution) wireless access technology.

Note that OTT service providers do not typically have access to wireless packet network QoS mechanisms and must rely on best effort packet delivery.

Mobile client 106 may become automatically activated or otherwise triggered in parallel with device 104 receiving and answering the incoming call, as indicated by the third uniform dashed line. Activating mobile client 106 may include activating the mobile client to monitor the QoS, or QoS parameter associated with an available PS network in parallel with the mobile device 104 being alerted or answering the call over the GS network 110. Activating mobile client 106 may include a trigger or alert for waking the client 106 up locally, for example, via a mobile GS network call event. Alternatively, a notification message may be sent to mobile client 106 (e.g., or mobile application) residing on mobile device 104 to activate the client remotely. In one embodiment, standard SIP signaling can be used to alert or remotely wake mobile client 106. Waking mobile client 106 may also include activating a Wi-Fi interface of mobile device 104 as indicated by step 4 of FIG. 1. Mobile client 106 may then try to connect via Wi-Fi (fixed PS) with service node 118 as indicated by the fourth uniform dashed line at step 5 of FIG. 1. Interacting with service node 118 may include passing packets between mobile client 106 and service node 118 and analyzing the quality of the packet connection, for example by monitoring round trip delay, bandwidth and bit error rate. As Wi-Fi interfaces may sometimes drain the battery of a mobile device, the Wi-Fi interface may be turned off as a default, thus waking mobile client 106 may activate or turn on the Wi-Fi interface, where applicable, and allow mobile client 106 to save power, while waking up in time to try to connect over Wi-Fi.

When QoS, or QoS parameter(s) meet or exceed a given minimum quality threshold, mobile client 106 may initiate a call transfer from a call established over mobile GS network 110 to an available PS network (e.g., via one of mobile PS network 114 or fixed PS network 116) when the PS network is available. Thus, the call may be transferred from mobile GS network 110 (e.g., dash line denoted by step 2) to fixed PS network 116 as indicated by the final uniform dashed arrow (e.g., dash line denoted by step 5). Fixed PS network 116 may be provided by any provider of such infrastructure, such as Internet service provider (ISP). Fixed PS network 116 may include any type of broadband access network including but not limited to such networks utilizing Ethernet, DSL, Wi-Fi, WiMax, etc.

In one aspect, mobile GS network 110 is the default delivery mode as bandwidth has been reserved thereby ensuring adequate QoS. In one embodiment, service node 118 includes a session initiation protocol (SIP) proxy server, application server (FIG. 8), or other node capable of originating and/or terminating communication sessions between endpoints such as mobile devices 102 and 104. Service node 118 may utilize SIP signaling technology and/or any other suitable protocol for establishing media sessions between devices 102 and 104 without departing from the scope of the subject matter described herein. The service node 118 would typically serve multiple users. In one embodiment, service node 118 may include a physical device, such as a computing platform that includes at least one processor and associated memory. Service node 118 may provide call processing capability to provide communication services for users. It may also include a call transfer function for receiving instructions to transfer calls between mobile GS network 110 and mobile or fixed PS networks 114 and 116, respectively.

Prior to or during call set up and/or after the incoming call is answered, mobile client 106 may wirelessly access an available PS network and transmit packets to and from service node 118. In one embodiment, mobile client 106 may monitor the bit rate, bit error rate, or latency associated with sending and receiving packets from service node 118. Such measurements may be reported to mobile client 106, and where the measurements meet or exceed the specified minimum quality threshold and where the connection is viable, then the call may be transferred to an available PS network, for example, fixed PS network 116. Mobile client 106 may issue a request or send instructions to service node 118 to indicate that a call transfer is to be performed. Call transfer includes the capability of dropping one call leg over a PS network (e.g., mobile PS network 114 or PS network 116) or GS network (e.g., mobile GS network 110), and replacing it with a leg over a different network utilizing a different delivery mode.

Figure 2:
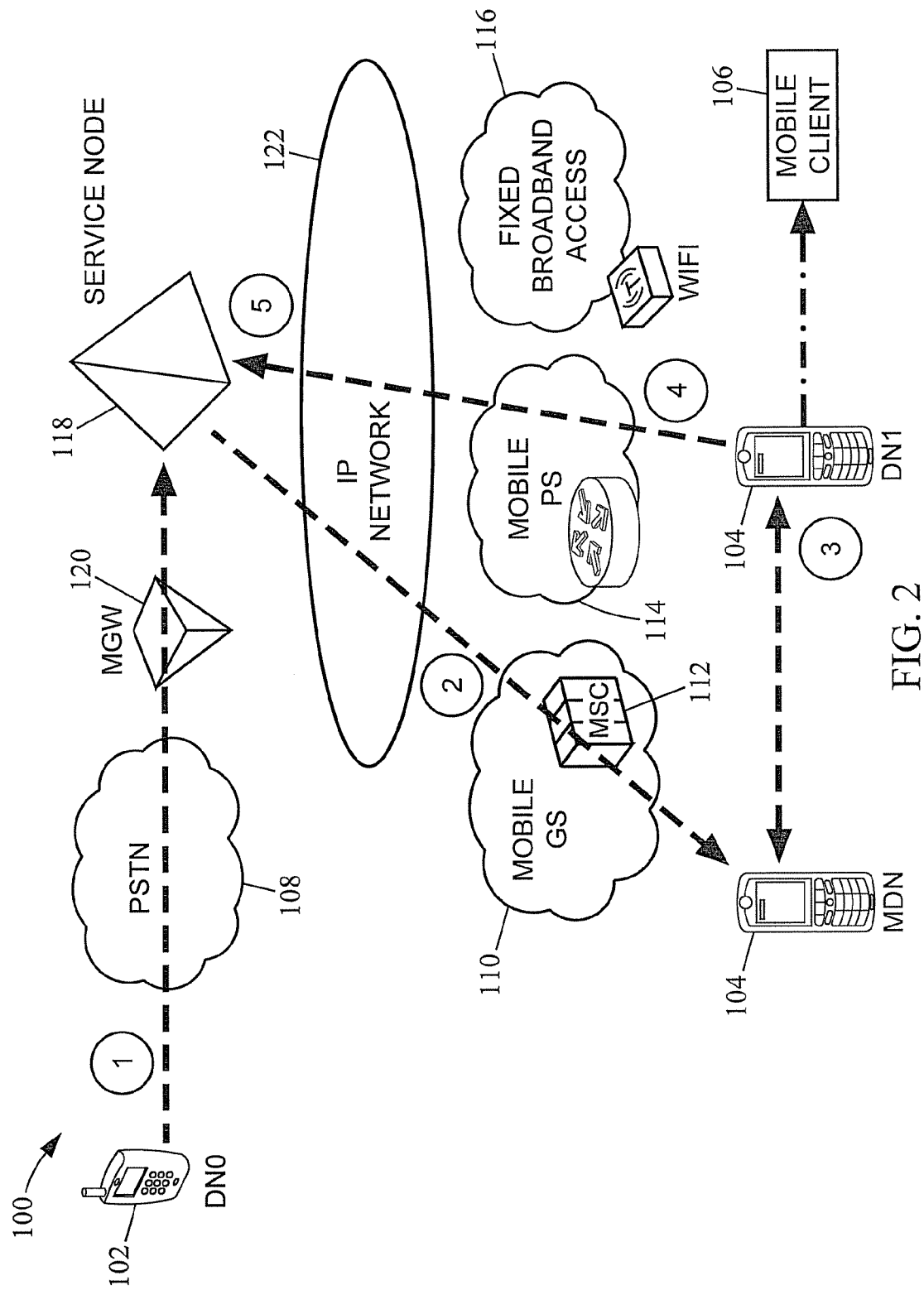
FIG. 2 is a network diagram illustrating a communication environment according a second embodiment of the present subject matter described herein.

FIG. 2 illustrates another embodiment of network 100, where an incoming call may be automatically transferred from mobile GS network 110 indicated by the first uniform dashed arrow (e.g., denoted by step 1) to the available mobile PS network 114 as indicated by the final dashed arrow (e.g., denoted by step 5). This may be another option where fixed PS network 116 is out of reach. In one embodiment, wireless PS network 114 may include mobile wireless and/or radio access networks provided by the mobile user's WSP. In one embodiment, as indicated by the second uniform dashed arrow, service node 118 first directs the incoming call from device 102 to device 104 via mobile GS network 110 where bandwidth has been reserved. Mobile client 106 may then be activated in parallel with device 102 receiving and answering the incoming call as indicated by the third uniform dashed arrow. In one embodiment, mobile client 106 may monitor QoS during the call. In another embodiment, mobile client 106 may be triggered during call set up to monitor QoS before the call is established. Activation of the mobile client may include locally or remotely activating the mobile client 106 via a call event or notification from service node 118.

Upon activation, and throughout or during the call, mobile client 106 may monitor the QoS of the available mobile PS network 114 (i.e., as indicated by step 4) and initiate a call transfer to the mobile PS network 114 when the QoS of the PS network 114 meets or exceeds the specified minimum quality threshold (i.e., as indicated by step 5). The minimum quality threshold may include, for example, a single measurement or a combination of bit rate, latency, and/or bit error rate or any other suitable measurement of transporting packets over PS network 114. In one embodiment, the minimum quality threshold of the PS network 114 may include a bit rate above 20 kbit/s. In another embodiment, latency of the PS network 114 may be less than or equal to 60 msec. In another embodiment, the bit error rate may be specified as less than or equal to a pre-defined percentage. Combinations of various values of bit rate, latency, bit error rate, and/or other suitable QoS measurements may be included in the minimum quality threshold. If the threshold is met, then the call may be automatically transferred from mobile GS network 110 to the PS network 114 so long as QoS of the PS network meets the specified minimum quality threshold or criterion/criteria values. Notably, mobile client 106 may continue to monitor QoS of PS network 114 and automatically transfer the call back to mobile GS network 110 where the QoS of PS network 114 fails to meet the minimum quality threshold.

Figure 3A:
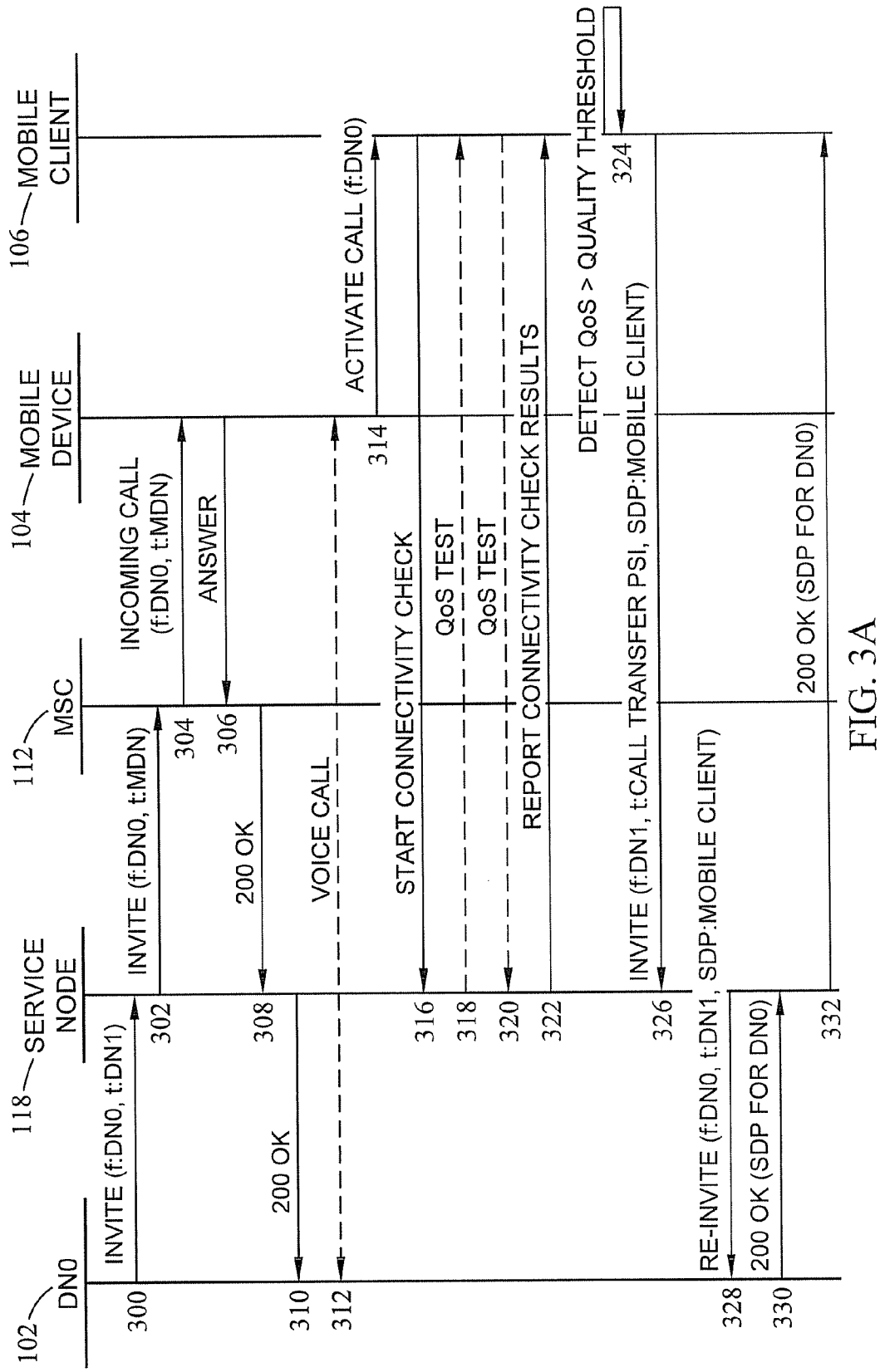
FIGS. 3A and 3B are a message flow diagram illustrating automatic transfer of a mobile call between a guaranteed service (GS) domain and a mobile client based on quality of service (QoS) measurements after call set up according to an embodiment of the subject matter described herein.
Figure 3B:
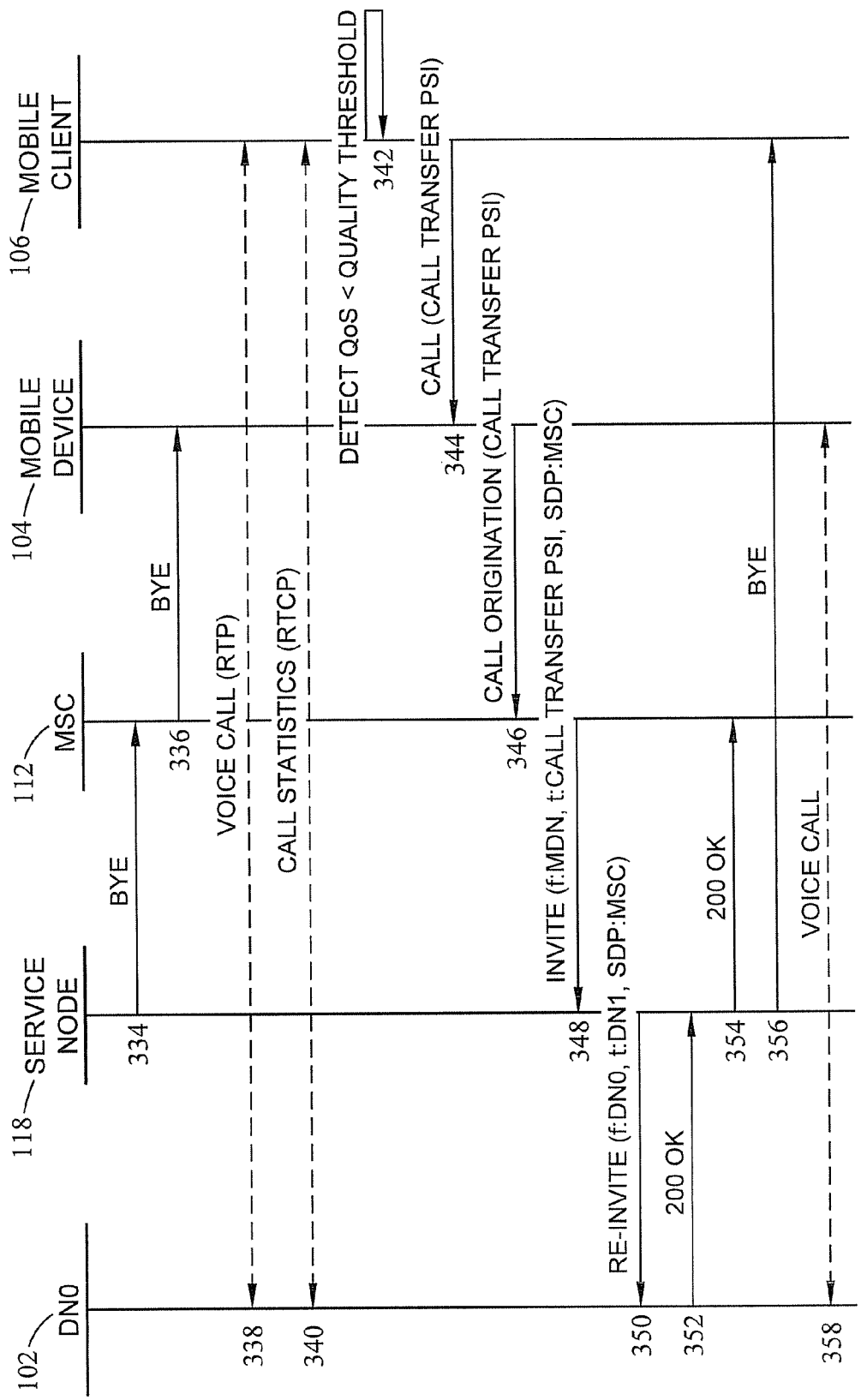

FIGS. 3A and 3B include a message flow diagram spanning more than one page and together illustrate exemplary messaging for facilitating the automatic transfer of calls from GS networks to PS networks based on QoS measurements, for example, as illustrated in FIGS. 1 and 2. Steps 300 to 312 of FIG. 3A illustrate signaling used to establish a mobile call. Although SIP signaling is used for illustration purposes, any protocol for establishing a call between mobile devices is envisioned without departing from the scope of the subject matter described herein. In step 300, mobile device 102 originates a call (from/f part is set to its associated directory number DN0) toward DN1 (to/t part set to DN1, the directory number associated with device 104). In step 302, the call reaches service node 118 via MGW 120. In this embodiment, the service node 118 is configured to first route incoming calls via the mobile GS network 110. Therefore the service node 118 routes the call in step 302 toward the directory number associated with mobile device 104 in the mobile GS network, which is MDN (see FIGS. 1 and 2). That call may traverse various network equipment, including MSC 112 at step 304 to reach the mobile device 104 over the mobile GS network 110. The user is assumed to answer the incoming call via the mobile device 104 as indicated at step 306. In steps 308 and 310, the 200 OK messages complete the call setup, resulting in a voice connection indicated at step 312 between device 102 and device 104 delivered via mobile GS network 110. Other routing and/or delivery nodes, gateways, switching centers, modules, or functions may be used during call set up and call routing and still fall within the scope of the described subject matter, for illustration purposes however, media gateway 120 and MSC 112 are shown and described. Calls may be routed in any suitable manner, including via any signaling protocol and/or trunking service without departing from the scope of the subject matter described herein.

Steps 314 to 338 of FIGS. 3A and 3B illustrate mobile client 106 becoming activated, performing QoS tests, and initiating a call transfer where QoS measurements meet or exceed a quality threshold or quality threshold value. During the call transfer, the call may be automatically transferred from mobile GS network 110 to an available PS network (e.g., mobile PS 114 or PS network 116) upon service node 118 receiving instructions from mobile client 106. In step 314, a call event or other trigger activates mobile client 106. For example, the mobile device 104 operating system may be configured to also activate the mobile client 106 with incoming call to mobile device 104 over the mobile GS network 110. Mobile client 106 may consist of a VoIP client running on device 104. Mobile client 106 can be notified that a call is taking place and can initiate a connectivity check of an available PS network in step 316. Mobile client 106 may connect to an available PS network (e.g., fixed or mobile PS network) and interact with service node 118, for example, by sending and receiving packets to and from service node 118 to test QoS and assess quality of the available PS network connection in both directions (i.e., round trip delay) as illustrated in steps 318 and 320. The duration of the QoS test via packet exchange can be set and established by mobile client 106, but is generally just long enough to verify a viable connection over the PS network and compare measured QoS values or parameters to the minimum quality threshold. In one embodiment, QoS may be tested over a fixed PS network (which may include a Wi-Fi connection) or a cellular PS connection where available. Notably, the Wi-Fi interface of mobile device 104 may be turned on during activation of mobile client 106 to enable connecting to the fixed PS network. Although Wi-Fi may be used in this embodiment, other forms of local wireless technologies can be used to achieve the same results (e.g. Bluetooth or other RF/IR signaling via a Bluetooth interface).

QoS measurements may include one or more measurements of latency, bit rate, and/or bit error rate values or parameters. In step 322, the results of the connectivity check are reported to mobile client 106 by service node 118. If the measurements are above a minimum quality threshold as determined in step 324, mobile client may then initiate a call transfer from the GS to the available PS network by issuing instructions to service node 118. Notably, transferring the call from mobile GS network 110 can decrease cost and minute consumption the WSP associates with the call. It may also allow traffic to be offloaded from the mobile GS network 110 to a fixed PS network 116, thereby reducing network congestion. This may also advantageously free up resources available to the WSP for providing service to other subscribers.

An exemplary embodiment of the call transfer is illustrated at steps 326 to 332. For example, a SIP invite may be sent from mobile client 106 to service node at step 326 over the available PS network. The invite may include a from (e.g., denoted 'f:') portion equal to DN1, identifying the requesting user (DN1). The invite to portion (e.g., denoted 't:') may be set to a public service identity (PSI) associated with a call transfer service supported on the service node 118. The service node 118 receiving the invite with the call transfer PSI can then try to retrieve information about any active call associated with the from portion, which is in this example DN1. Since a call is already established (in steps 300-312) with DN1, upon receipt of the invite service node 118 may now attempt to transfer the established call toward the mobile client 106. In step 326, the invite included the session description protocol (SDP) associated with the mobile client 106. In step 328, service node 118 uses a re-invite to update the connection with device 102 providing the updated SDP for mobile client 106. In steps 330 and 332, the 200 OK messages indicate mobile device 102 accepting the call request from mobile client 106 and communication of the SDP associated with mobile device 102 to mobile client 106. In practice, the SDP may point to MGW 120 as in this embodiment it provides the conversion from PSTN circuit switched voice to VoIP to facilitate the interactions with the service node 118.

Continuing into FIG. 3B, service node 118 may drop the original call leg established over the mobile GS network by sending a BYE message in step 334. In step 336, the MSC completes the process by sending a BYE message to mobile 104, indicating that the original call leg carried over the mobile GS network 110 is being dropped. Step 338 depicts the resulting voice path, where the delivery mode of the call has successfully been transferred from mobile GS network 110 to an available PS network (e.g., networks 114 or 116) via a wireless connection with mobile client 106. Voice call traffic may be exchanged at step 338 using real-time transport protocol (RTP) packets. Notably, the delivery mode of the call is changed during the call from mobile GS network 110 to an available PS network via mobile client 106.

Steps 340 to 358 of FIG. 3B illustrate continued monitoring of QoS associated with the wireless connection to PS network via mobile client 106. Notably, mobile client 106 may continuously monitor QoS throughout the duration of the call and can automatically switch between GS and PS network connections, thereby benefitting from advantages provided by both networks. FIG. 3B illustrates the automatic transfer of the call back to the GS network where QoS of the PS connection begins to fail to meet the minimum quality threshold. Thus, the call may automatically revert back to GS network 110 when QoS is known but cost to the user is higher. In step 340, call statistics of the RTP voice session carried over the PS network may be monitored, for example, by monitoring RTP control protocol (RTCP) call statistics. That is, the RTP packets carry media information, and RTCP may be used to carry call statistics between the mobile devices engaged in the call, at least for the VoIP portion of the call path. In this embodiment, RTCP provides out-of-band statistics and control information for the RTP flow. RTCP may be used to continuously monitor QoS of the transferred call leg established over the PS network where a voice session is carried over the network. When QoS is determined to be below a given quality threshold at step 342, for example, should the user move to an area of the PS network where coverage is inferior and packet loss becomes excessive, the mobile client 106 may then trigger a revert back to GS delivery mode via GS network 110.

In step 344, the mobile client 106 initiates the call transfer to the GS network by instruction the mobile device 104 (specifically a GS calling function of mobile device 104) to initiate a call to the call transfer PSI, hosted on the service node 118. In step 346, the mobile device 104 initiates that call via MSC 112. In step 348, MSC 112 signals a SIP invite to service node 118, with the invite f: portion set to MDN (directory number of the mobile device 104 in the GS network) and the t: portion set to the call transfer PSI. Service node 118 receives the invite and associates MDN with DN1, and retrieves information for any active call with DN1. Since there is a call in progress with DN1, service node 118 thus triggers the call transfer process by re-inviting (step 350) the other party (DN0) and providing the SDP information associated this time with MSC 112. In steps 352 and 354, mobile device 102 accepts the request by signaling 200 OK messages through service node 118 to MSC 112. In step 356, the call leg between service node 118 and mobile client 106 over the PS network can be dropped. Step 358 illustrates the new voice call carried over mobile GS network 110. The call has successfully been transferred from mobile client 106 back to mobile GS network 110. Notably, the mobile call may automatically be seamlessly transferred during the call based on QoS measurements, and whether the measurements meet or fail to meet the minimum quality threshold.

Figure 4:
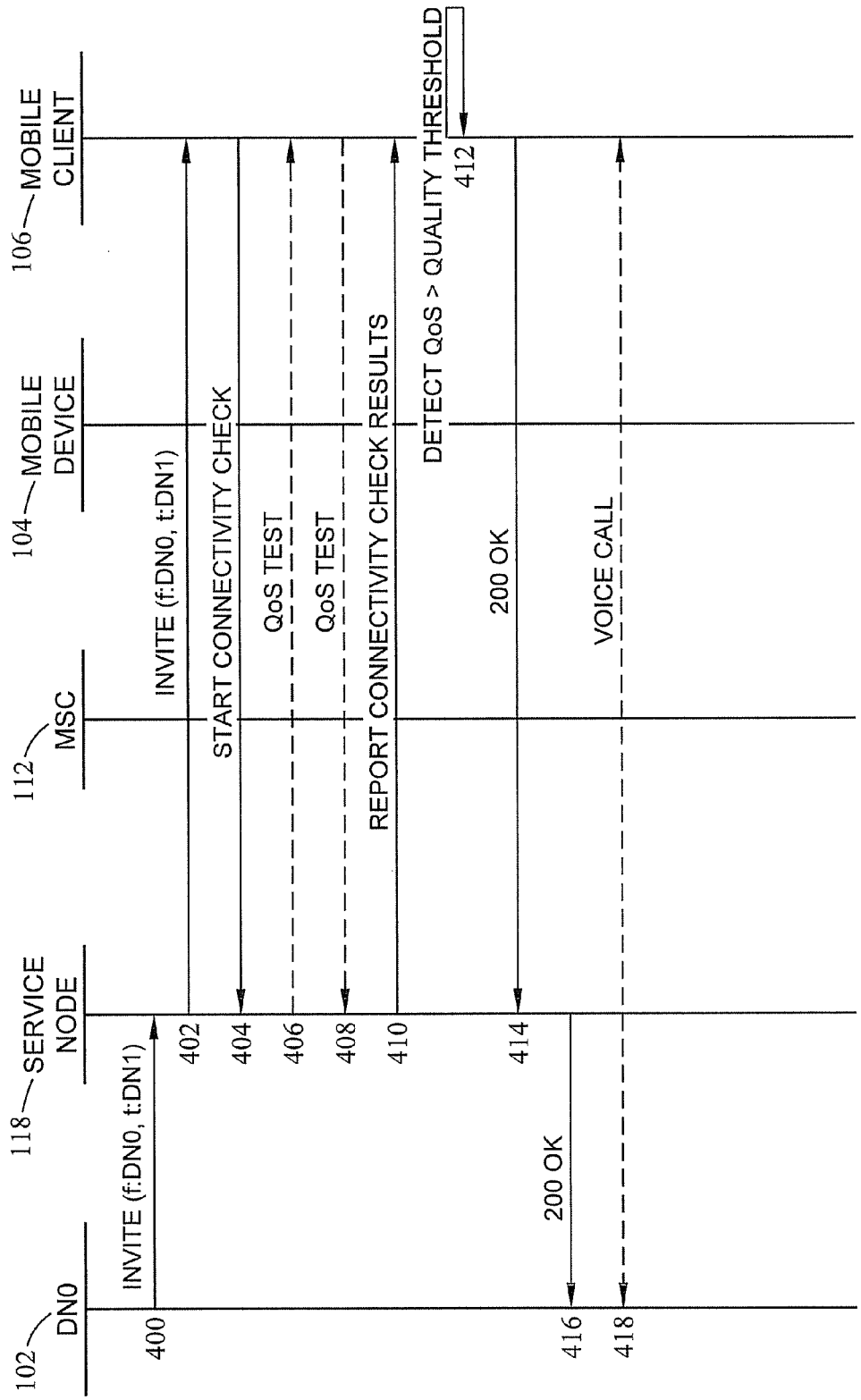
FIGS. 4 and 5 are message flow diagrams illustrating QoS measurements performed during call set up and automatic transfer of a mobile call to the domain having the highest quality connection according to an embodiment of the subject matter described herein.
Figure 5:
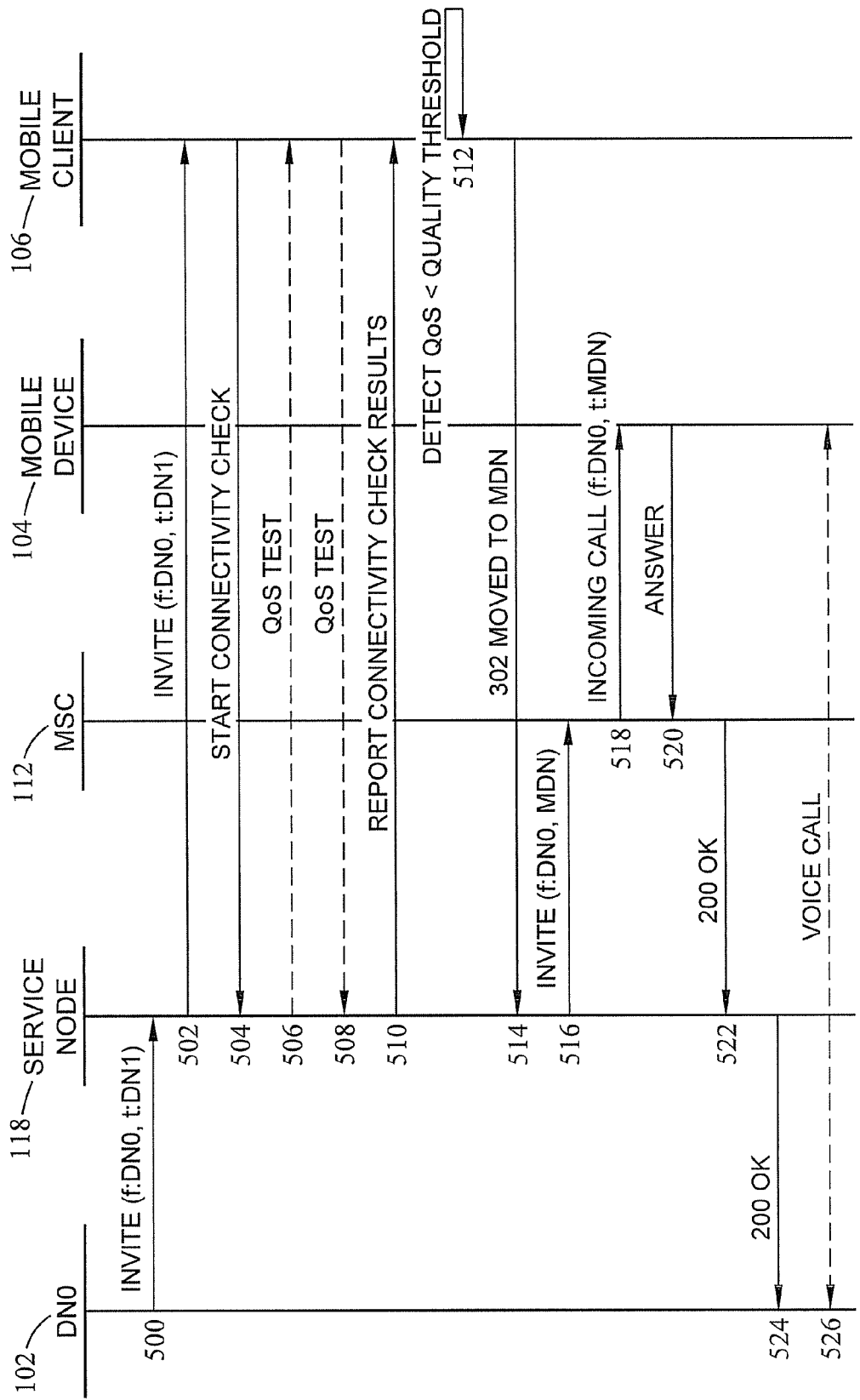

FIGS. 4 and 5 illustrate message flows for an embodiment where QoS measurements are performed during call set up, prior to establishment of the voice bearer path. That is, mobile client 106 may already be awake and wirelessly connected to an available mobile or fixed PS network, and mobile client 106 is already capable of receiving SIP messages from service node 118. In this embodiment, a VoIP call may be tried first for all inbound calls as opposed to trying GS network 110 first as previously described. Mobile client 106 may be wirelessly connected via the mobile or fixed PS network (e.g., network 114 or 116). Steps 400 and 402 initiate the call set-up by first sending a SIP invite message at step 400 from mobile device 102 associated with DN0 to DN1, where DN1 is the directory number associated with the user served by the service node 118. The invite is routed via service node 118 to mobile client 106 at step 402. Before accepting the call, mobile client 106 may begin a connectivity check at step 404 to assure that the quality of the PS connection is good. Packets may be exchanged between mobile client 106 and service node 118 at steps 406 and 408 and QoS tests, or measurements may be performed. The QoS results are compared to a quality threshold at step 412, and where the QoS meets or exceeds the quality threshold, the call will be delivered via the PS network associated with mobile client 106. At steps 414 and 416, mobile client 106 accepts and answers the call from device 102 using the PS network. The voice bearer path 418 is established between mobile device 102 and device 104 via mobile client 106. In one embodiment, the voice call includes an RTP voice session, where QoS may be continuously monitored by mobile client 106 via RTPC as previously described.

FIG. 5 is similar to FIG. 4 in that the QoS measurements are performed during call set up, however, FIG. 5 illustrates an embodiment where QoS fails to meet the predefined quality threshold, as such, the voice session may automatically become redirected to mobile GS network 110. At step 500 a SIP invite may be sent from DN0 to DN1 to initiate call set up. The invite is forwarded to mobile client 106 at step 502 by service node 118. Mobile client 106, which is already connected to an available fixed or mobile PS network (e.g., 114 or 116), begins the connectivity check at step 504. Packets may be exchanged at steps 506 and 508, and mobile client performs a QoS test measuring for example, bit rate, latency, and/or bit error rate associated with the PS connection. Any suitable measurement corresponding to any aspect of QoS over a PS network may be performed. At step 510 the connectivity results are reported to mobile client 106, and at step 512 it is determined that the QoS fails to meet the minimum quality threshold. Thus, the media flow will be transferred from the PS network associated with DN1 to mobile GS network 110. At step 514, mobile client 106 sends a request to service node 118 that the call be moved to MDN via mobile GS network 110. In response to the request, service node 118 may try and connect the call via mobile GS network 110. To do so, service node 118 signals a SIP invite toward MSC 112 at step 516. MSC 112 routes the call to the mobile device 104 at step 518, and mobile device 104 answers the call at step 520. The call is acknowledged as answered by the 200 OK messages signaled through service node 118 at steps 522 and 524. The voice bearer path between devices 102 and 104 is now established at step 526 over mobile GS network 110, which has adequate, pre-allocated bandwidth, thereby resulting in improved QoS over the PS network. Notably, FIGS. 4 and 5 illustrate an embodiment where incoming call may be answered in a PS or GS network based on QoS measurements performed during call set up (i.e., before the incoming call is answered). QoS of the available PS network may be continually monitored throughout the duration of the call, and where it meets or exceeds a quality threshold, the call may be automatically transferred to the available PS network to reduce costs, bandwidth, and/or minutes consumed for a voice or data plan.

Figure 6:
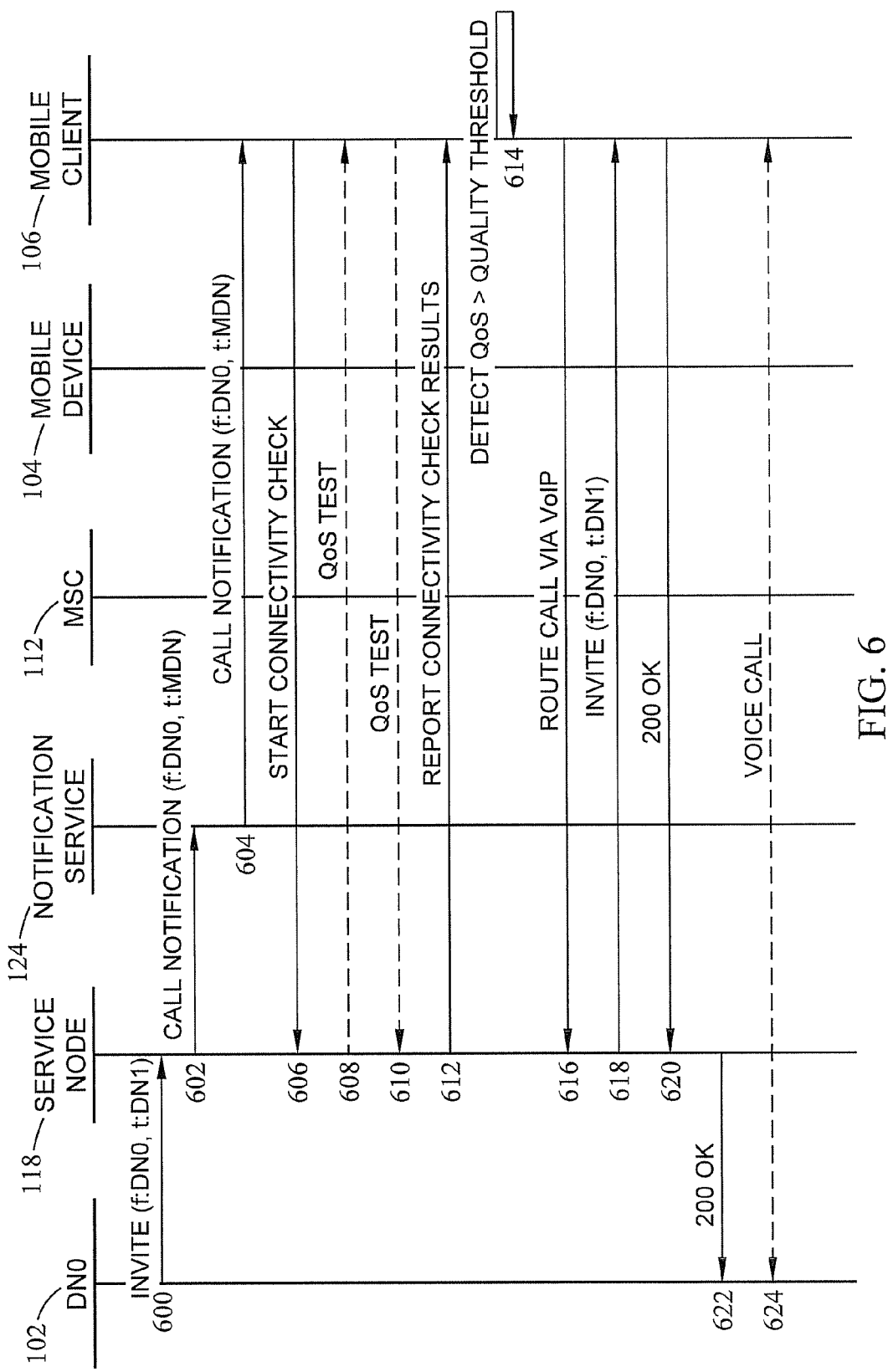
FIGS. 6 and 7 are message flow diagrams illustrating a notification service for activating a mobile client according to an embodiment of the subject matter described herein.
Figure 7:
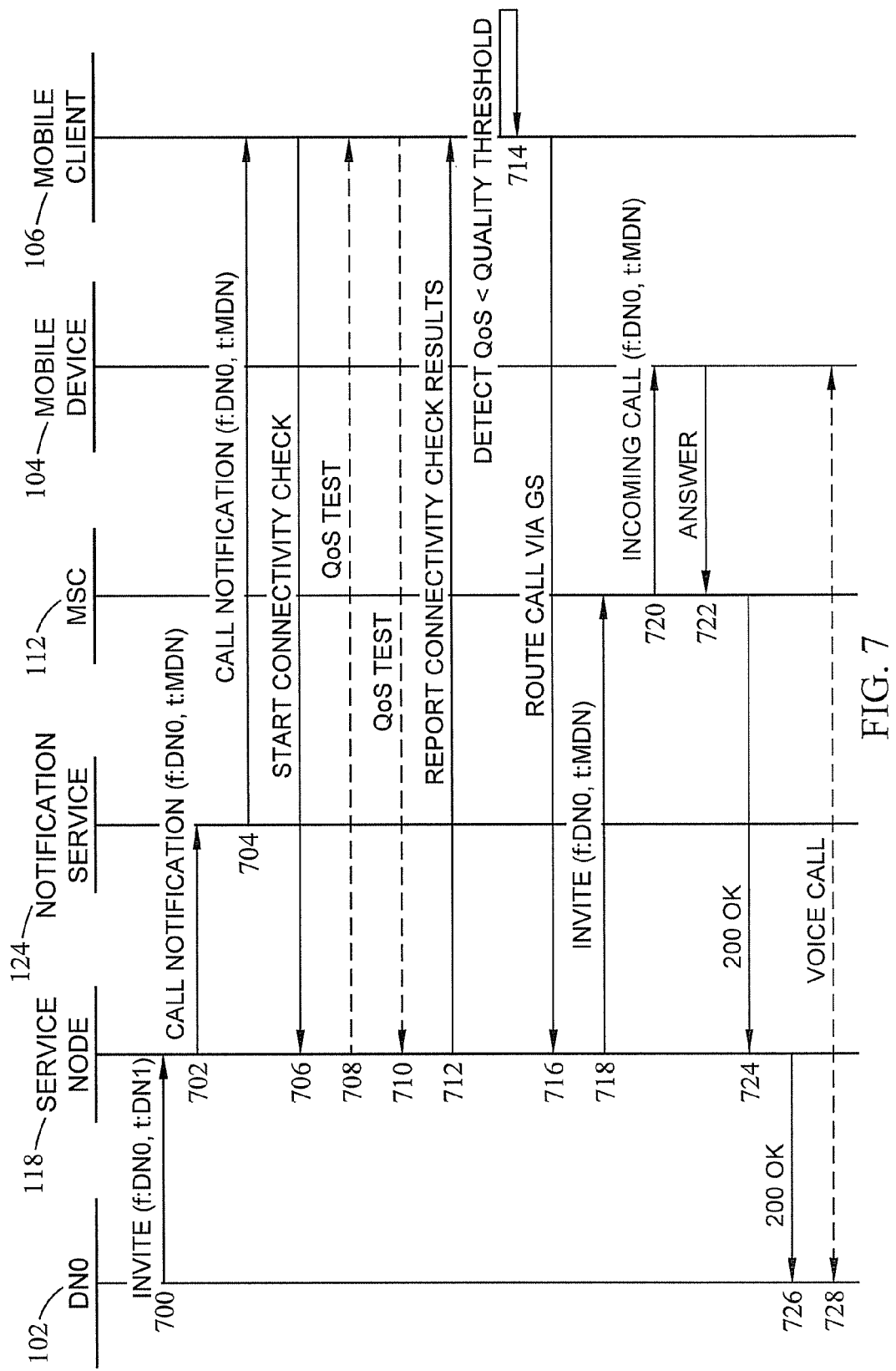

FIGS. 6 and 7 illustrate further embodiments of the subject matter described herein where a notification service 124 may be used to activate mobile client 106. That is, mobile client 106 may be triggered, activated, or otherwise notified to initiate the connectivity check via notification service 124 as opposed to receiving a SIP invite or call event activation as illustrated in previously described figures. In one embodiment the notification is real-time and can be initiated during call set up. In step 600, a SIP invite is sent from DN0 to DN1. Service node 118 receives the invite and sends a notification to notification service 124 at step 602. Notification service 124 can be provided by companies providing the mobile device operating system such as Apple® for the iPhone®. At step 604, notification service 124 notifies mobile client 106 and indicates the incoming call from DN0 to DN1 thus triggering the QoS measurement. Mobile client 106 may then begin the connectivity check at step 606 upon receiving the notification to determine whether the call may be answered via an available PS network or the intended GS network. Packets may be exchanged during steps 608 and 610 and mobile client may perform a QoS test measuring, for example, one or more parameters including bit rate, latency, and/or bit error rate associated with the wireless PS connection. At step 612 the connectivity results may be reported to mobile client 106, and at step 614 it is determined that the QoS meets or exceeds the quality threshold. Thus, mobile client 106 sends instruction to the service node 118 to route the call using VoIP via an available mobile or fixed PS network whose QoS was just assessed at step 616. In response, service node 118 routes a SIP invite over the PS network in step 618. The invite is answered by the mobile client and consequently a SIP 200 OK message is sent at steps 620 and relayed at step 622. The voice call is established at step 642 and delivered using a PS delivery mode over a mobile or fixed PS network (e.g., 114 or 116) wirelessly connected with mobile client 106.

Referring now to FIG. 7, the call set up and notification steps from 700 to 712 correspond to previously described steps 600 to 612 depicted in FIG. 6. At step 714, it is determined that QoS of the PS network connection fails to meet the quality threshold. Thus, the wireless connection with PS network is deemed as poor, or spotty and mobile client 106 may then instruct service node 118 to route the call via mobile GS network 110 at step 716. In an alternative embodiment, where the connection is so bad such that service node 118 does not receive a response from mobile client 106, service node 118 may then automatically deliver the call via mobile GS network 110 after a predefined duration, or time limit. At step 718, service node 118 sends a SIP invite to MDN, the mobile identity in the mobile GS network. MSC 112 receives the SIP invite and alerts, using standard cellular techniques, mobile device 104 over mobile GS network 110 at step 720. The mobile device 104 may then answer the call at step 722, resulting in SIP 200 OK messages at steps 724 and 726. The call is established between mobile devices 102 and 104 and delivered in GS mode via GS network 110 at step 728. Notably, mobile client 106 may continue to monitor QoS for an available PS network, and where QoS meets or exceeds the quality threshold, the call may be automatically transferred to the PS network connection to take advantage of that connection.

Figure 8:
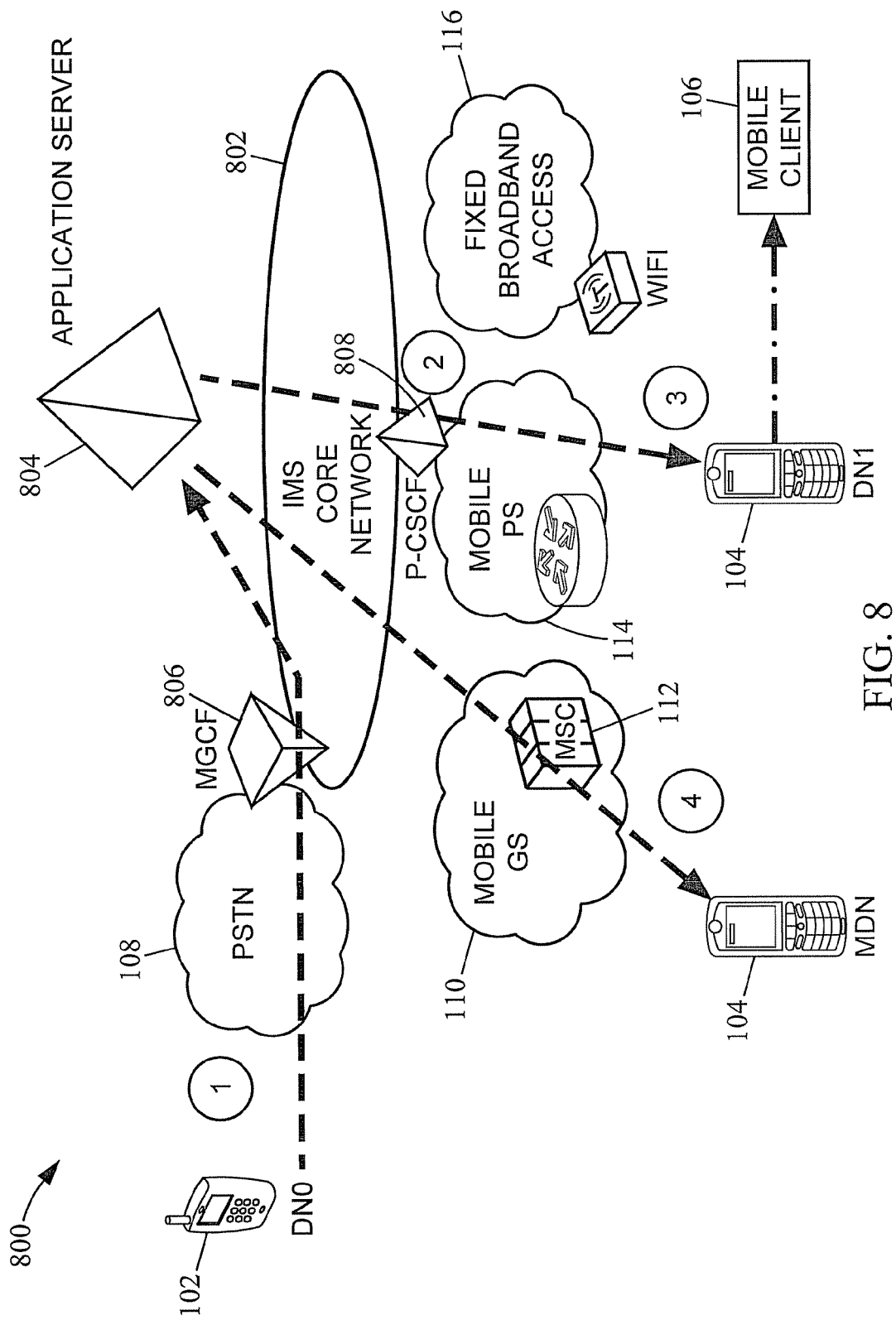
FIG. 8 is a network diagram illustrating a communication environment according a third embodiment of the present subject matter described herein.

FIG. 8 is network diagram illustrating another embodiment of an exemplary communication environment or network, generally designated 800. FIG. 8 illustrates a solution that could be deployed by a wireless carrier as opposed to the OTT solutions previously described and illustrated in FIGS. 1 and 2. For example, the PS connection may use 4G or LTE wireless technologies. FIG. 8 delivers IP services via an IP multimedia subsystem (IMS) core network 802 architecture. The service node of network 800 may include an application server 804, which performs similar functions as service node 118 previously shown and described in FIGS. 1 and 2. Application server 804 is used to facilitate the establishment of media sessions between various endpoints, including between mobile devices 102 and 104. The application server 804 interacts with the IMS core network 802 using standard IMS mechanisms.

In one embodiment, incoming call may first be routed from device 102 via the PSTN 108 as indicated by the first dashed arrow. The call may encounter a media gateway controller function (MGCF) 806 which performs call control protocol conversion between the PSTN network and the VoIP IMS network. Application server 804 may route the incoming call to device 104 (which has directory number DN1) via the IMS core network 802, including a proxy-call session control function (P-CSCF) 808. P-CSCF 808 may deliver the call to device 104 over mobile PS network 114. That is, the original call may first be delivered via mobile PS network 114 as opposed to other previously described embodiments which may have utilized a GS network (e.g., network 110) as the initial delivery mode. If the user moves and/or roams, the call may be automatically transferred to mobile GS network 110 based on unacceptable QoS measurements. For example, mobile client 106 may send or exchange packet information back and forth with application server 804 for continuously monitoring QoS. If QoS of the PS connection drops below a quality threshold, mobile client 106 may instruct application server 804 to automatically transfer the call to mobile GS network 110. Thus, the call leg from application server 804 to DN1 may become dropped and replaced with the call leg setup over the mobile GS network as illustrated by the uniform dashed line at step 4 over GS network 110. To initiate the transfer, application server 804 may receive instructions from mobile client 106 and initiate the transfer via IMS core 802.

Figure 9:
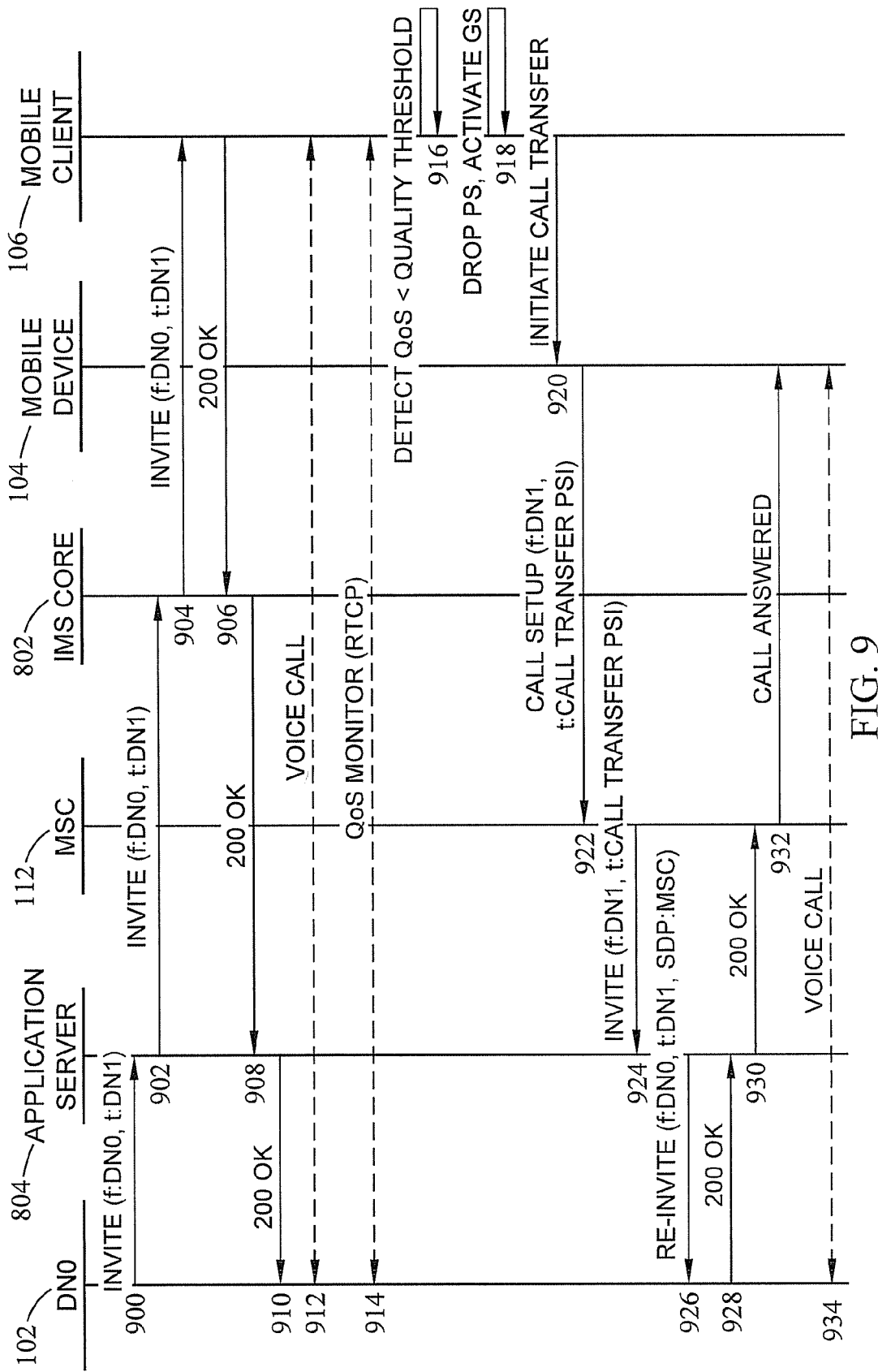
FIG. 9 is a is a message flow diagram illustrating an automatic transfer of a mobile call between networks based on QoS measurements after call setup according to an embodiment of the subject matter described herein.

FIG. 9 is a message flow diagram illustrating the automatic transfer of a mobile call as illustrated in FIG. 8. Call set up may be performed via standard SIP signaling in steps 900 to 910. At step 900, a SIP invite originated at device 102 may be received at application server 804. The invite indicates that the caller is DN0 and is intended for DN1, where DN1 is the directory number associated with device 104. At step 902, the SIP invite is forwarded via the IMS core network 802 to P-CSCF 808 which can route the invite to mobile client 106 at step 904 via PS network 114. Mobile client 106 authorizes and indicates acceptance of the call via the 200 OK messages at steps 906, 908, and 910. This can result in the voice call being established and delivered over the PS network as shown in step 912 between device 102 and mobile client 106. Mobile client 106 initiates QoS monitoring at step 914 using RTCP. If, at any time, the QoS over the PS network fails to meet the predefined quality threshold as shown in step 916, then the call can be automatically rerouted to the GS network. Mobile client 106 may decide that call leg over the PS network be dropped and replaced with a call leg over the GS network at 918.

The call transfer to the GS network is initiated at step 920 by mobile client 106. To initiate the call transfer, GS network access functionality of mobile device 104 is activated via mobile client and a call is placed from the mobile device on the circuit side towards the call transfer PSI at step 922. The call would reach application server 804 at step 924. Application server 804 may then re-invite mobile device 102 using the updated SDP to specify that traffic should be moved to MSC 112. The 200 OK messages at steps 928 and 930 indicate that the move has been accepted. At step 932, MSC 112 signals to mobile device 104 that the call was answered, resulting in the voice call being effectively transferred from the PS network and is now delivered over the mobile GS network 110 at step 934.

Figure 10:
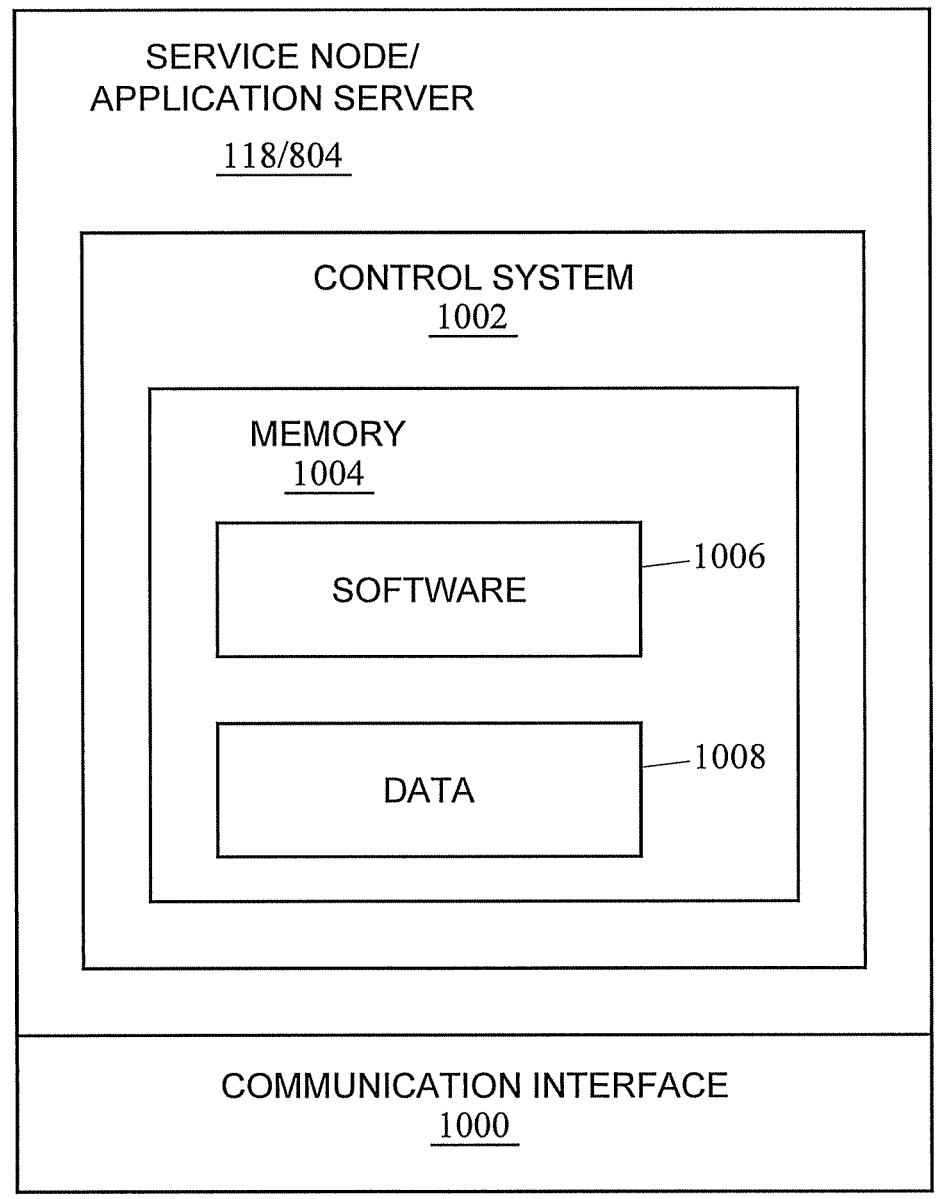
FIG. 10 is a block diagram schematically illustrating a service node/application server according to an embodiment of the present subject matter.

FIG. 10 is a block diagram schematically illustrating an exemplary node, for example, the previously described service node 118 and/or application server 804 according to an embodiment of the present subject matter. In one embodiment, service node 118 and/or application server 804 may support and provide call processing capability to provide communication services for users. Node 118/804 may include a communication interface 1000 for instructing and initiating call set up between devices 102 and 104 over a GS and/or PS network. In one embodiment, communication interface 1000 may be based on IP protocol, carrying various signaling or control protocol such as session initiation protocol (SIP), a SOAP interface, a hypertext transfer protocol (HTTP) interface, Diameter, Radius, LDAP, and/or any other suitable protocol useful for general telecommunication purposes. Interface 1000 may be adapted for signaling other nodes (e.g., MSC 112, notification service 124, P-CSCF 808 of IMS core 802, etc.) for establishment of voice or data sessions between one or more mobile devices and may also receive instructions from mobile client 106 indicating that a call transfer is to be performed. A call transfer includes dropping a call leg established over one of a GS or PS network in favor of a new call leg based upon measurement of QoS in the PS network before and/or during the call. Node 118/804 may support a call transfer service from which it may retrieve information about active calls to one or more users. Node 118/804 may further include a control system 1002 and memory 1004 suitable for implementing the subject matter described herein. Memory 1004 may include software 1006 and data 1008 for performing one or more functions. In one embodiment, a call transfer function and/or a call transfer module of node 118/804 may perform the call transfer upon receipt of instructions to transfer or move a call between mobile GS network 110 and mobile or fixed PS networks 114 and 116.

Figure 11:
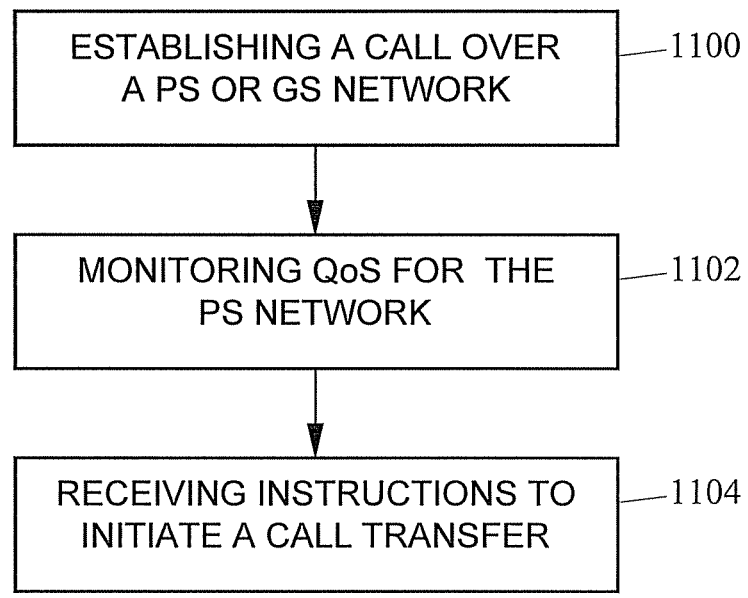
FIG. 11 is flow chart illustrating an exemplary process for an automatically transferring a mobile call between networks based on QoS measurements according to an embodiment of the subject matter described herein.

FIG. 11 is a flow chart illustrating an exemplary method for automatically transferring a call between PS and GS networks based on QoS measurements according to an embodiment of the subject matter described herein. Referring to FIG. 11, in step 1100 an incoming call may be established over a PS or GS network as previously described. For example, SIP signaling at the service node 118 or application server 804 may be used for facilitating call set up. In step 1102, QoS of an available PS network may be monitored, for example, using mobile client 106 to monitor and analyze a QoS parameter. QoS monitoring may include measuring one or more parameter values including the bit rate, latency, or bit error rate associated with packets sent between mobile client 106 and service node 118 (or application server 804). When mobile client detects that QoS of the PS network meets or exceeds a quality threshold, a call may remain and/or be transferred to PS network. When QoS of the PS network fails to meet the quality threshold, the call may remain and/or be transferred to GS network. In step 1104, instructions indicating that a call transfer is to be performed may be communicated from mobile client 106 and received by service node 118 or application server 804 when client 106 interfaces with service node 118.

It will be understood that various details of the subject matter described herein may be changed without departing from the scope of the subject matter described herein. Furthermore, the foregoing description is for the purpose of illustration only, and not for the purpose of limitation.

What is claimed is:

1. A service node configured to automatically transfer a mobile call between a packet switched (PS) network and a guaranteed service (GS) network, the service node comprising:
a processor; and
a memory coupled to the processor, the memory having program instructions stored thereon that, upon execution by the processor, cause the service node to:
facilitate establishment of a call between a first mobile device and a second mobile device via the GS network;
receive an instruction from a mobile client executed by the first mobile device to start a connectivity check;
in response to the instruction, measure a quality of service (QoS) parameter of a connection between the first mobile device and the service node via the PS network;
report the measured QoS parameter to the mobile client; and
initiate an operation to transfer the call from the GS network to the PS network in response to an indication from the mobile client that the measured QoS parameter meets or exceeds a minimum quality threshold.

2. The service node of claim 1, wherein the program instructions, upon execution by the processor, further cause the service node to activate the mobile client in the first mobile device.

3. The service node of claim 1, wherein the program instructions, upon execution by the processor, further cause the service node to turn on a local wireless interface of the first mobile device.

4. The service node of claim 1, wherein the program instructions, upon execution by the processor, further cause the service node to continuously monitor the QoS parameter associated with the PS network during the call.

5. The service node of claim 1, wherein the program instructions, upon execution by the processor, further cause the service node to monitor the QoS parameter associated with the PS network during call setup and prior to the call being answered by the second mobile device.

6. The service node of claim 1, wherein the QoS parameter is measured by analyzing one or more parameter values associated with packets that are transported between the mobile client and the service node.

7. The service node of claim 6, wherein the one or more parameter values include one of bit rate, latency, or bit error rate.

8. The service node of claim 1, wherein the PS network comprises a 4G mobile PS network.

9. The service node of claim 1, wherein the PS network comprises a PS network.

10. The service node of claim 1, wherein the GS network comprises a mobile 2G or 3G network.

11. The service node of claim 3, wherein the service node turns on the local wireless interface on the mobile device by activating the mobile client at initiation of the call via the GS network.

12. The service node of claim 3, wherein the local wireless interface includes one of a WiFi or a Bluetooth interface.

13. The service node of claim 1, wherein the mobile client is triggered using a call event, SIP invite, or notification service.

14. A method for the automatic transfer of a call between a packet switched (PS) network and a guaranteed service (GS) network, the method comprising:
establishing the call between a first mobile device and a second mobile device via the GS network;
receiving an instruction from a mobile client executed by the first mobile device to start a connectivity check;
in response to the instruction, monitoring a quality of service (QoS) parameter of a connection between the first mobile device and the service node via the PS network;
reporting the measured QoS parameter to the mobile client; and
initiating an operation to transfer the call from the GS network to the PS network in response to an indication from the mobile client that the measured QoS parameter meets or exceeds a minimum quality threshold.

15. The method of claim 14, wherein monitoring the QoS parameter comprises continuously monitoring the QoS parameter during the call.

16. The method of claim 14, wherein monitoring the QoS parameter comprises monitoring the QoS parameter during call setup and prior to the call being answered.

17. The method of claim 14, wherein monitoring the QoS parameter comprises analyzing one or more performance parameter values associated with packets that are transported between the mobile client and a service node.

18. The method of claim 17, wherein analyzing one or more performance parameter values comprises measuring bit rate, latency, or bit error rate associated with packet transport between the mobile client and the service node.

19. The method of claim 14, wherein establishing the call comprises establishing a call over a mobile PS network.

20. The method of claim 14, wherein establishing the call comprises establishing the call over a fixed PS network.

21. The method of claim 14, wherein establishing the call comprises establishing the call over a mobile 2G or 3G network.

22. The method of claim 17, wherein the mobile client turns on a local wireless interface on the mobile device to access the PS network.

23. The method of claim 22, wherein the local wireless interface includes one of a WiFi or a Bluetooth interface.

24. The method of claim 14, further comprising activating the mobile client to monitor the QoS parameter in parallel with answering the call.

25. The method of claim 24, wherein activating the mobile client comprises triggering the mobile client using a call event, SIP invite, or notification service.

26. A non-transitory computer readable medium having stored thereon computer executable instructions that, upon execution by a service node, cause the service node to:

facilitate establishment of a call between a first mobile device and a second mobile device via the GS network;

receive an instruction from a mobile client executed by the first mobile device to start a connectivity check, wherein the instruction is generated by the mobile client in response to a notification sent to the mobile device by a third-party, wherein the notification is distinct from a SIP invite or call event activation, and wherein the notification causes a local wireless interface of the mobile device to be turned on;

in response to the instruction, measure a quality of service (QoS) parameter of a connection between the first mobile device and the service node via the PS network using the local wireless interface;

report the measured QoS parameter to the mobile client; and initiate an operation to transfer the call from the GS network to the PS network in response to an indication from the mobile client that the measured QoS parameter meets or exceeds a minimum quality threshold.

\* \* \* \* \*